United States Patent [19]

Nakamura

[11] Patent Number: 4,781,024

[45] Date of Patent: Nov. 1, 1988

[54] STATIC CUP SEAL ASSEMBLY FOR MASTER CYLINDER END

[75] Inventor: Kaoru Nakamura, Anjo, Japan

[73] Assignee: Aisin Seiki Kabushiki Kaisha, Kariya, Japan

[21] Appl. No.: 831,635

[22] Filed: Feb. 21, 1986

[30] Foreign Application Priority Data

Mar. 7, 1985 [JP] Japan .............................. 60-033255[U]
Mar. 7, 1985 [JP] Japan .............................. 60-033256[U]

[51] Int. Cl.$^4$ ............................................. F16J 15/18
[52] U.S. Cl. ........................................ 60/533; 92/168; 277/152; 277/212 C
[58] Field of Search ................ 92/168; 60/562, 594, 60/533; 277/152 X, 165, 205, 206 R, 212 R, 212 C

[56] References Cited

U.S. PATENT DOCUMENTS

| | | | |
|---|---|---|---|
| 2,660,493 | 11/1953 | Flick | 277/205 |
| 3,175,474 | 3/1965 | Eickmann | 92/168 |
| 4,060,023 | 11/1977 | Vegella | 92/168 |
| 4,093,313 | 6/1978 | Burckhardt | 60/562 X |
| 4,472,941 | 9/1984 | Schopper et al. | 60/562 |
| 4,481,865 | 11/1984 | Becht et al. | 92/168 X |
| 4,526,089 | 7/1985 | Takeuchi | 92/168 X |
| 4,601,235 | 7/1986 | Roberts | 277/212.6 X |
| 4,627,332 | 12/1986 | Furuta et al. | 60/533 X |

FOREIGN PATENT DOCUMENTS

| | | | |
|---|---|---|---|
| 516 | 2/1979 | European Pat. Off. | 277/205 |
| 2537868 | 3/1977 | Fed. Rep. of Germany | 60/562 |
| 54-20261 | 2/1979 | Japan | 277/205 |
| 58-160607 | 9/1983 | Japan | 60/562 |
| 2052656 | 1/1981 | United Kingdom | 60/562 |
| 2085983 | 5/1982 | United Kingdom | 277/152 |

*Primary Examiner*—Robert E. Garrett
*Assistant Examiner*—George Kapsalas
*Attorney, Agent, or Firm*—Burns, Doane, Swecker & Mathis

[57] ABSTRACT

A master cylinder for use in automotive hydraulic brake device has a pressure liquid chamber formed at one side of the larger diameter portion of the piston and a supply liquid chamber formed between the other side of the large diameter portion of the piston and a ring-shaped cup seal. The inner lip of the ring-shaped cup seal is integrally formed at its distal end with an annular projection coming into contact with a cup seal locking member, which is inserted in the large diameter portion of the cylinder and serves to prevent a movement of the ring-shaped cup seal towards the supply liquid chamber, so that the deformation of the inner lip is restrained.

6 Claims, 4 Drawing Sheets

STATIC CUP SEAL ASSEMBLY FOR MASTER CYLINDER END

FIELD OF THE INVENTION

The present invention relates to a master cylinder for use in hydraulic brake devices and hydraulic clutch release devices of motor vehicles, and more particularly to an improvement in a master cylinder comprising; a cylinder body having a cylinder opened at one end; a piston having a large diameter portion slidably fitted in a small diameter portion of the cylinder and provided with a cup seal attached to one side of the large diameter portion for contact with an inner periphery of the small diameter portion of the cylinder, and a small diameter portion projected out of the cylinder; and a ring-shaped cup seal made of elastic material, arranged within a large diameter portion at one end of the cylinder in fixed relationship with respect to the cylinder body, and having an outer lip in contact with an inner periphery of the large diameter portion of the cylinder and an inner lip in slidable contact with an outer periphery of the small diameter portion of the piston, wherein a pressure liquid chamber is formed at one side of the larger diameter portion of the piston, and a supply liquid chamber communicating with a reservoir is formed between the other side of the large diameter portion of the piston and the ring-shaped cup seal.

BRIEF DESCRIPTION OF THE PRIOR ART

A conventional master cylinder of this type is described, for example, in Japanese Utility Model Laid-Open No. 59-151762. In the master cylinder known from this Utility Model, the sealing effect between a ring-shaped cup seal arranged within a large diameter portion at one end of a cylinder of a cylinder body and a small diameter portion of a piston is produced by an inner lip of the ring-shaped cup seal which comes into contact with an outer periphery of the small diameter portion of the piston by its own elasticity, and the sealing effect between the large diameter portion of the cylinder and an outer lip of the ring-shaped cup seal is produced by the outer lip which comes into contact with an inner periphery of the large diameter portion of the cylinder by its own elasticity. Thus, as the piston reciprocately moves, the inner lip is pulled by frictional forces created between the small diameter portion of the piston and the inner lip of the ring-shaped cup seal, and the negative pressure generated in a supply liquid chamber which causes the inner lip to float away from the outer periphery of small diameter portion of the piston. The outer lip also tends to float away from the inner periphery of the large diameter portion of the cylinder due to the negative pressure generated in the supply liquid chamber. In view of the above-described forces on the inner and outer lips, to obtain a positive sealing effect, two ring-shaped cup seals are arranged within the large diameter portion of the cylinder in tandem.

However, a reduction in the manufacturing cost to achieve the positive sealing between the cylinder body and the small diameter of the piston cannot be obtained by the use of two ring-shaped cup seals. In other words, if the positive sealing can be achieved by a single ring-shaped cup seal, a reduction in the manufacturing cost becomes possible due to the reduced number of ring-shaped cup seals and number of assembly steps for the master cylinder.

Achievement of the positive sealing by a single ring-shaped cup seal requires that, as to the sealing between the ring-shaped cup seal and the large diameter portion of the cylinder, the sufficient sealing effect should be produced even with the negative pressure generated in the supply liquid chamber, and that, as to the sealing between the ring-shaped cup seal and the small diameter portion of the piston, the sufficient sealing effect should be produced, even if the inner lip is pulled by frictional forces caused between the inner lip and the small diameter portion of the piston or the negative pressure is generated in the supply liquid chamber.

As a method of meeting the above requirement, it is conceivable to increase rigidity of the inner and outer lips of the ring-shaped cup seal, thereby enhancing push forces thereof against the peripheries of the small diameter portion of the piston and the large diameter portion of the cylinder. But, this method may be further improved, because it deteriorates operability of inserting the ring-shaped cup seal into the large diameter portion of the cylinder and also increases the sliding resistance of the piston, thereby reducing the efficiency of the master cylinder.

SUMMARY OF THE INVENTION

It is a main object of the present invention to, with a view of producing the positive sealing effect by the use of a single ring-shaped cup seal, provide the sufficient sealing effect between the ring-shaped cup seal and a small diameter portion of a piston even if an inner lip of the cup seal is pulled or the negative pressure is generated in a supply liquid chamber, without increasing rigidity of the inner lip.

It is another object of the present invention to provide the sufficient sealing effect between the ring-shaped cup seal and a large diameter portion of a cylinder even if the negative pressure is generated in the supply liquid chamber, without increasing rigidity of an outer lip of the cup seal.

In accordance with the present invention, the inner lip of the ring-shaped cup seal is integrally formed at its distal end with an annular projection coming into contact with a cup seal locking member, which is inserted in the large diameter portion of the cylinder and serves to prevent a movement of the ring-shaped cup seal toward the supply liquid chamber, to thereby restrain deformation of the inner lip at least when the inner lip is deformed due to the negative pressure generated in the supply liquid chamber, the annular projection being formed to have a sharpened distal end in cross section.

According to the present invention thus arranged, even if rigidity of the inner lip of the ring-shaped cup seal is selected to such an extent that the inner lip may be deformed by frictional forces between the inner lip and the small diameter portion of the piston or due to the negative pressure generated in the supply liquid chamber. The inner lip is restrained from floating away from an outer periphery of the small diameter portion of the piston by the annular projection coming into contact with the cup seal locking member, thereby producing the sufficient sealing effect. Moreover, according to the present invention, since the annular projection formed at the distal end of inner lip of the ring-shaped cup seal has its sharpened distal end in cross section and, when the ring-shaped cup ring is expanded, deformation of the annular projection will not restrict extension of the inner lip, there can be avoided the case of an annular projection rectangular in cross section and unsusceptible to deform, that the inner lip would be brought into pressure contact with the piston and hence the sliding resistance of the piston would be increased in an expanded state of the cup seal.

To achieve the above another object, in accordance with the present invention, a base part of the ring-shaped cup seal is formed on its outer periphery with an annular convexity coming into contact with a tapered region defined between a small diameter region of the large diameter portion of the cylinder in which the ring-shaped cup seal is to be arranged and a large diameter region thereof in which a cup seal locking member serving to prevent the ring-shaped cup seal from moving out of the cylinder is to be arranged, at least when the outer lip is deformed due to the negative pressure generated in the supply liquid chamber.

According to the present invention thus arranged, even if rigidity of the outer lip of the ring-shaped cup seal is selected to such a lower extent that the outer lip may be deformed due to the negative pressure generated in the supply liquid chamber, the ring-shaped cup seal and the large diameter portion of the cylinder are positively sealed therebetween by the annular convexity coming into contact with the tapered region of large diameter portion of the cylinder, thereby producing the sufficient sealing effect. In particular, according to the present invention, since the annular convexity formed on the outer periphery of base part region of large diameter of the cylinder so that, when the outer lip is deformed inwardly due to the negative pressure generated in the supply liquid chamber, the annular convexity moves nearly perpendicularly relative to the tapered region, the sealing pressure expected between the tapered region and the annular convexity is unsusceptible to an influence of variations in the part dimension caused during the manufacture, whereby it becomes easy to obtain the sealing effect as expected. In addition, since the annular convexity cup seal is expanded, the disadvantage does not occur, as in the case where the protrusion cannot escape radially outwardly (the annular convexity is brought into contact with the small diameter region of large diameter portion of the cylinder), that the base part of the ring-shaped cup ring would come at its inner periphery into pressure contact with the piston (primary piston in the embodiment) and the sliding resistance of the piston would be increased in an expanded state of the cup seal. It also becomes possible to simplify a shape of the cup seal locking member which serve to prevent the ring-shaped cup seal from moving out of the large diameter portion of the cylinder, with the result that manufacture of the cup seal locking member can be facilitated.

DETAILED DESCRIPTION OF THE INVENTION

For clear understanding of the present invention, one embodiment of the invention will now be described in conjunction with the drawings.

Figure 1:
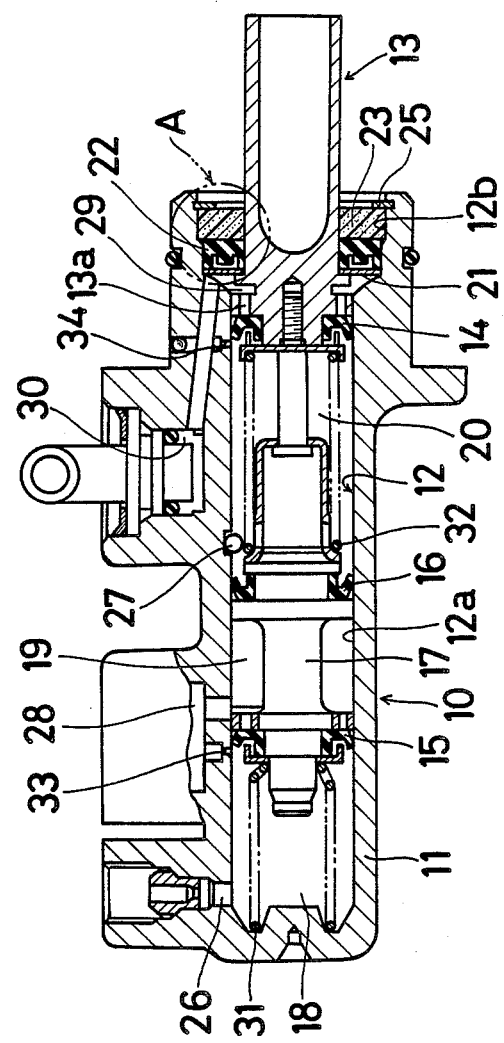
FIG. 1 is a longitudinal sectional view of one embodiment of the present invention.
Figure 2:
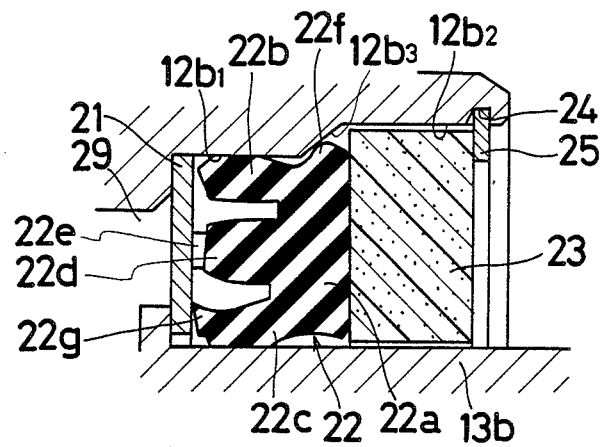
FIG. 2 is an enlarged view of a portion A in FIG. 1.

Referring to FIGS. 1 and 2, a cylinder body 11 of a master cylinder 10 has a cylinder 12 comprising a small diameter portion 12a on the left side and a large diameter portion 12b on the right side. A large diameter portion 13a at the left end of a primary piston 13 including a rubber-made cup seal 14 attached to the left side of the large diameter portion 13a is slidably fitted within the small diameter portion 12a of the cylinder 12, and a secondary piston 17 including the rubber-made cup seals 15, 16 attached to both ends thereof is also slidably fitted within the small diameter portion 12a. The secondary piston 17 forms a pressure liquid chamber 18 and a supply liquid chamber 19 in the cylinder 12, and further forms a pressure liquid chamber 20 in cooperation with the primary piston 13. These pressure liquid chambers 18, 20 are communicated with outlets 26, 27 of the cylinder body 11, respectively, while the supply liquid chamber 19 is communicated with an inlet 28 which in turn communicates with a reservoir (not shown).

The large diameter portion 12b of the cylinder 12 is formed into a stepped cylinder comprising a small diameter region 12b1 on the left side, a large diameter region 12b2 on the right side, and a tapered region 12b3 located therebetween. Within the small diameter region 12b1 and the tapered region 12b3, there are assembled an annular piston stopper/cup seal locking member 21 and a ring-shaped cup seal 22 in this order from left. Within the large diameter region 12b2, there is assembled an annular piston guide/cup seal locking member 23 made of synthetic resin, which is locked by a snap ring 25 fitted in an annular groove 24 of the cylinder body 11. It is to be noted that the tapered region 12b3 is generally provided for the purpose of improving operability of inserting the ring-shaped cup seal 22 into the large diameter portion of the cylinder.

Figure 3:
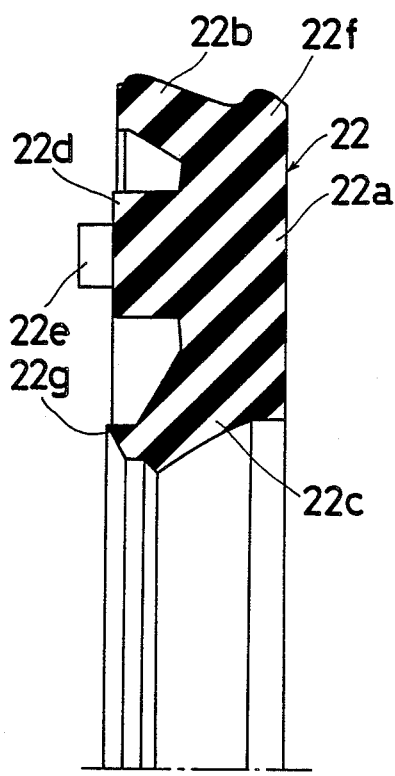
FIG. 3 is a sectional view of a ring-shaped cup seal in FIG. 2.
Figure 4:
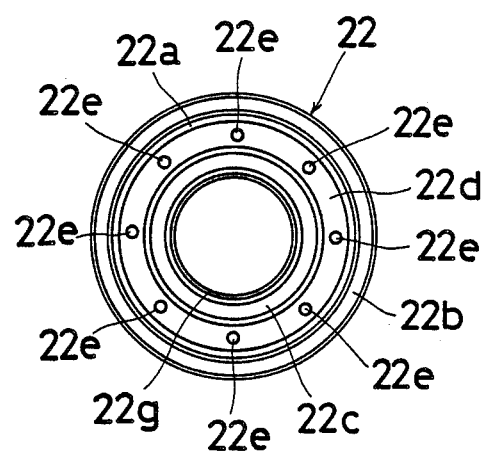
FIG. 4 is a view of the ring-shaped cup seal of FIG. 3 as seen from left.

As shown in FIGS. 2 through 4, the ring-shaped cup seal 22 is formed of rubber and comprises; a base part seal 22a contacting at the right side thereof with the piston guide/cup seal locking member 23; an outer lip 22b integrally formed at the outer periphery of the base part 22a and contacting with the small diameter region 12b1 of the cylinder's large diameter portion 22b; an inner lip 22c integrally formed at the inner periphery of the base part 22a and slidably contacting with an outer periphery of a small diameter portion 13b of the primary piston 13 which portion 13b is projected out of the cylinder 12; an annular thick part 22d integrally formed with the base part 22a to be located between the outer and inner lips; and of the annular thick part 22d and abutting against the right side of the piston stopper/cup seal locking member 21. The ring-shaped cup seal 22 further includes an annular convexity 22f integrally formed at the outer periphery of the base part 22a and slightly contacting with the tapered region 12b3 of the cylinder's large diameter portion 12b, and an annular projection 22g integrally formed at the distal end of the inner lip 22c and contacting with the right side of the piston stopper/cup seal locking member 21, the annular projection 22g having a wedge-like shape in cross section.

Figure 5:
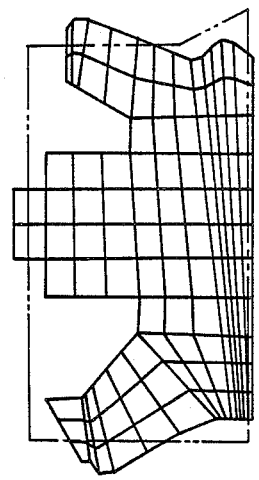
FIGS. 5 and 6 are computer analysis diagrams showing deformation of the ring-shaped cup seal and distribution of sealing pressures in a free state and an assembled state, respectively.
Figure 6:
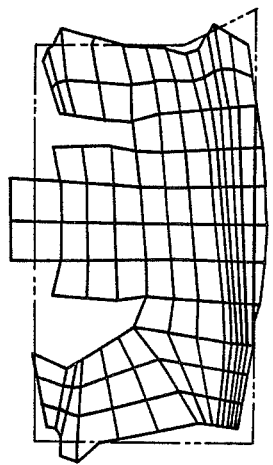

FIGS. 5 and 6 are diagrams showing the results of computer analysis on how the ring-shaped cup seal 22 is deformed and on which distribution of sealing pressures is caused to exhibit therein, when it is assembled into the large diameter portion 12b of the cylinder. FIG. 5 represents a free state and FIG. 6 represents an assembled state of the ring-shaped cup seal 22 into the large diameter portion 12b of the cylinder. In these figures, one-dot chain lines indicate an installation space of the ring-shaped cup seal 22 which space is defined by the small diameter region 12b1 and the tapered region 12b3 of the cylinder's large diameter portion 12b, the piston stopper/cup seal locking member 21, the piston guide/cup seal locking member 23, and the small diameter portion 13b of the primary piston 13. In FIG. 6, lines depicted outside the one-dot chain lines indicate the distribution of sealing pressures. As seen from the distribution of sealing pressures, the ring-shaped cup seal 22 is sandwiched at the base part 22a, the annular thick part 22d and the bosses 22e thereof between the piston stopper/cup seal locking member and the piston guide/cup seal locking member 23, whereby the ring-shaped cup seal 22 is fixed with respect to the cylinder body 11.

A supply liquid chamber 29 formed between the large diameter portion 13a of the primary piston 13 and the ring-shaped cup seal 22 is communicated with an inlet 30 which in turn communicates with the reservoir.

FIG. 1 represents a state where no actuation forces (leftward) are exerted upon the primary piston 13, and the primary piston 13 and the secondary piston 17 are held in their returned positions as shown by return springs 31 and 32, respectively. When actuation forces are exerted upon the primary piston 13, the primary piston 13 is caused to slide leftwardly and the secondary piston 17 is then pushed leftwardly to slide through the return spring 32. As a result, in FIG. 1, the pressure liquid chambers 18, 20 having communicated with the inlets 28, 30 through compensating ports 33, 34, respectively, are now disconnected from the inlets 28, 30 so that the liquids in the pressure liquid chambers 18, 20 are pressurized and then discharged through outlets 26, 27, respectively. When the primary piston 13 and the secondary piston 17 are both caused to slide leftwardly in this way, the inner lip 22c is pulled by frictional forces caused between the small diameter portion 13b of the primary piston 13 and the inner lip 22c of the ring-shaped cup seal 22. At the same time, as the capacity of the supply liquid chamber 29 is enlarged, there generates a negative pressure in the supply liquid chamber 29. This negative pressure acts on the outer lip 22b and the inner lip 22c of the ring-shaped cup seal 22 causing them to deform inwardly and outwardly, respectively. On this occasion, however, the outward deformation of the inner lip 22c is restrained by the fact that the annular projection 22g formed at the distal end of the inner lip 22c is in contact with the piston stopper/cup seal locking member 21, so that the sufficient sealing effect is maintained between the ring-shaped cup seal 22 and the small diameter portion 13b of the primary piston 13. Meanwhile, although the outer lip 22b is deformed radially inwardly and this makes less the sealing pressure between the outer lip and the small diameter region of the cylinder's diameter portion, the inward deformation of the outer lip 22b simultaneously causes the outer peripheral region of the base part 22a to deform, i.e., bend toward the outer lip. With such deformation of the base part 22a in its outer peripheral region, the annular convexity 22a is pushed against the tapered region 12b3 to increase the sealing pressure between the annular convexity 22f and the tapered region 12b3, so that the sufficient sealing effect is still maintained between the ring-shaped cup seal 22 and the large diameter portion 12b of the cylinder.

Figure 7:
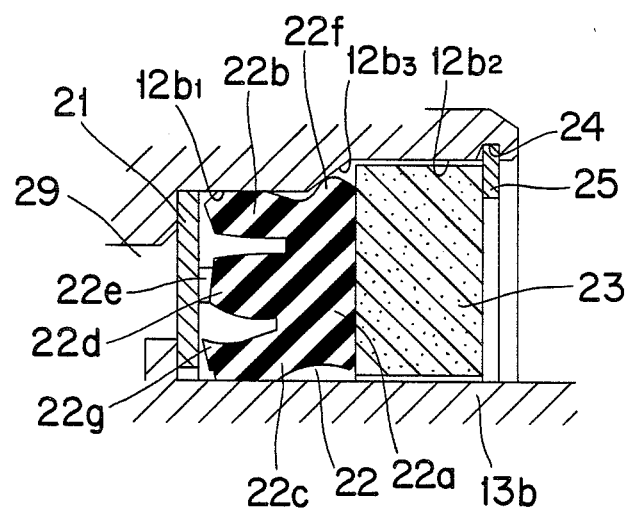
FIG. 7 is a view similar to FIG. 2 showing a different relationship between the ring-shaped cup seal and the cup seal locking member.

While in the above embodiment the annular projection 22g is formed to be always in contact with the cup seal locking member 21 for restraining deformation of the inner lip 22c of the ring-shaped cup seal 22, the similar operation and effect can also be attained with such a modified arrangement that the annular projection 22g is normally apart from the cup seal locking member 21 to a small extent and brought into contact with the cup seal locking member 21 when the inner lip 22c is deformed. That modified arrangement is shown in FIG. 7. Moreover, while the sufficient sealing effect between the ring-shaped cup seal 22 and the large diameter portion 12b of the cylinder is maintained by the annular convexity 22f contacting with the tapered region 12b3 when the outer lip 22b of the ring-shaped cup seal 22 is deformed due to the negative pressure generated in the supply liquid chamber, the annular convexity 22f may be brought into contact with the small diameter region 12b2 of the cylinder's large diameter portion 12b.

As fully described in the above, in accordance with the present invention, the sufficient sealing effect can be provided between a ring-shaped cup seal and a small diameter portion of a piston (primary piston in the above embodiment), without increasing rigidity of an inner lip of the ring-shaped cup seal. In particular, according to the present invention, since an annular projection formed at the distal end of inner lip of the ring-shaped cup seal has a sharpened distal end in cross section and, when the ring-shaped cup ring is expanded, deformation of the annular projection will not restrict extension of the inner lip, there can be avoided a fear, as encountered in case of an annular projection rectangular in cross section and unsusceptible to deform, that the inner lip would be brought into pressure contact with the piston and hence the sliding resistance of the piston would be increased in an expanded state of the ring-shaped cup seal.

What is claimed is:

1. In a master cylinder comprising; a cylinder body having a cylinder opened at one end; a piston having a large diameter portion slidably fitted in a small diameter portion of said cylinder and provided with a cup seal attached to one side of the large diameter portion for contact with an inner periphery of the small diameter portion of said cylinder, and a small diameter portion projected out of said cylinder; and a ring-shaped cup seal made of elastic material, arranged within a large diameter portion at one end of said cylinder in fixed relationship with respect to said cylinder body, and having an outer lip in contact with an inner periphery of the large diameter portion of said cylinder and an inner lip in slidable contact with an outer periphery of the small diameter portion of said piston, wherein a pressure liquid chamber is formed at one side of the larger diameter portion of said piston and a supply liquid chamber communicating with a reservoir is formed between the other side of the large diameter portion of said piston and said ring-shaped cup seal, the improvement comprising the inner lip of said ring-shaped cup seal being integrally formed at its distal end with an annular projection in contact with a first cup seal locking member, which is inserted in the large diameter portion of said cylinder and serves to prevent a movement of said ring-shaped cup seal towards said supply liquid chamber, to thereby restrain deformation of said inner lip at least when said inner lip is deformed due to the negative pressure generated in said supply liquid chamber, said annular projection being formed to have a sharpened distal end in cross section, said ring-shaped cup seal being formed on an outer periphery of a base part with an annular convexity which comes into contact with a tapered region located between a small diameter region of the large diameter portion of said cylinder in which said ring-shaped cup seal is to be arranged and a large diameter region thereof in which is located a second cup seal locking member adapted to prevent said ring-shaped cup seal from moving out of said cylinder, at least when said outer lip is deformed radially inwardly due to the negative pressure generated in said supply liquid chamber; one each of said first cup seal locking member, said ring shaped cup seal and a second cup seal locking member being arranged, in that order, within the large diameter portion of said cylinder from an innermost side.

2. In a master cylinder comprising; a cylinder body having a cylinder opened at one end; a piston having a large diameter portion slidably fitted in a small diameter portion of said cylinder and provided with a cup seal attached to one side of the large diameter portion for contact with an inner periphery of the small diameter portion of said cylinder, and a small diameter portion projected out of said cylinder; and a ring-shaped cup seal made of elastic material, arranged within a large diameter portion at one end of said cylinder in fixed relationship with respect to said cylinder body, and having an outer lip in contact with an inner periphery of the large diameter portion of said cylinder and an inner lip in slidable contact with an outer periphery of the small diameter portion of said piston, wherein a pressure liquid chamber is formed at one side of the larger diameter portion of said piston and a supply liquid chamber communicating with a reservoir is formed between the other side of the large diameter portion of said piston and said ring-shaped cup seal, the improvement comprising the inner lip of said ring-shaped cup seal being integrally formed at its distal end with an annular projection spaced from a first cup seal locking member, which is inserted in the large diameter portion of said cylinder and serves to prevent a movement of said ring-shaped cup seal towards said supply liquid chamber, to thereby restrain deformation of said inner lip at least when said inner lip is deformed due to the negative pressure generated in said supply liquid chamber, said annular projection being formed to have a sharpened distal end in cross section, said ring-shaped cup seal being formed on an outer periphery of a base part with an annular convexity which comes into contact with a tapered region located between a small diameter region of the large diameter portion of said cylinder in which said ring-shaped cup seal is to be arranged and a large diameter region thereof in which is located a second cup seal locking member adapted to prevent said ring-shaped cup seal from moving out of said cylinder, at least when said outer lip is deformed radially inwardly due to the negative pressure generated in said supply liquid chamber, said annular convexity being pressed to the tapered portion of the cylinder so as to obtain a positive sealing effect when the outer lip is pulled by the negative pressure generated in the supply liquid chamber while also being unrestrained outwardly in the radial direction to avoid pressure contact between an inner periphery of the base part and the piston when the seal is expanded.

3. A master cylinder according to claim 2, wherein said first cup seal locking member, said ring-shaped cup seal and a second cup seal locking member, one for each, are arranged within the large diameter portion of said cylinder in this order from the innermost side.

4. A master cylinder according to claim 1, wherein said annular projection of said ring-shaped cup seal is normally contacted at its distal end with said cup seal locking member.

5. A master cylinder according to claim 2, wherein a base part of said ring-shaped cup seal has an integral annular thick part located between said inner and outer lips, a multiplicity of bosses are integrally formed on a distal end face of the annular thick part and brought into abutment against said cup seal locking member to thereby prevent said ring-shaped cup seal from moving toward said supply liquid chamber, and a second cup seal locking member is arranged on the open side of said cylinder with respect to said ring-shaped cup seal and brought into abutment against said base part to thereby restrict said ring-shaped cup seal from moving toward the open side of said cylinder.

6. A master cylinder according to claim 5, wherein said first cup seal locking member also serves as a piston stopper which is contactable at its inner periphery with a shoulder of said piston for defining the end of a return stroke of said piston, and said second cup seal locking member also serves as a piston guide an inner periphery of which functions to guide the small diameter portion of said piston.

* * * * *